(12) United States Patent
Jiang

(10) Patent No.: US 12,276,509 B2
(45) Date of Patent: Apr. 15, 2025

(54) MAP DATA QUERY METHOD AND APPARATUS, COMPUTER DEVICE, AND STORAGE MEDIUM

(71) Applicant: Tencent Technology (Shenzhen) Company Limited, Shenzhen (CN)

(72) Inventor: Min Jiang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 352 days.

(21) Appl. No.: 17/516,498

(22) Filed: Nov. 1, 2021

(65) Prior Publication Data

US 2022/0049962 A1 Feb. 17, 2022

Related U.S. Application Data

(63) Continuation of application No. PCT/CN2020/098573, filed on Jun. 28, 2020.

(30) Foreign Application Priority Data

Aug. 30, 2019 (CN) .......................... 201910819012.X

(51) Int. Cl.
*G01C 21/32* (2006.01)
*G06F 16/22* (2019.01)
(Continued)

(52) U.S. Cl.
CPC .......... *G01C 21/32* (2013.01); *G06F 16/2246* (2019.01); *G06F 16/24552* (2019.01); *G06F 16/29* (2019.01); *G06F 16/9537* (2019.01)

(58) Field of Classification Search
CPC .... G01C 21/32; G01C 21/3896; G01C 21/30; G06F 16/2246; G06F 16/24552; G06F 16/29; G06F 16/9537
See application file for complete search history.

(56) References Cited

U.S. PATENT DOCUMENTS

2006/0271557 A1 11/2006 Harward et al.
2007/0118564 A1* 5/2007 Qi ...................... G09B 29/106
(Continued)

FOREIGN PATENT DOCUMENTS

CN 102426778 A 4/2012
CN 103575266 A 2/2014
(Continued)

OTHER PUBLICATIONS

Tencent Technology, WO, PCT/CN2020/098573, Sep. 29, 2020, 4 pgs.

(Continued)

*Primary Examiner* — Ig T An
*Assistant Examiner* — Christine Nguyen Huynh
(74) *Attorney, Agent, or Firm* — Morgan, Lewis & Bockius LLP

(57) ABSTRACT

A map data query method is performed at a computer device, the method including: obtaining a current position of a vehicle; requesting map data matching the current position from a cloud database; caching the requested map data returned from the cloud database locally; constructing a real-time spatial index of the locally-cached map data according to road elements in the locally-cached map data; in response to a query request transmitted by an application layer associated with the vehicle, querying the locally-cached map data at which the query request is aimed according to the real-time spatial index to generate a query result; and returning the query result to the application layer.

16 Claims, 10 Drawing Sheets

(51) Int. Cl.
*G06F 16/2455* (2019.01)
*G06F 16/29* (2019.01)
*G06F 16/9537* (2019.01)

(56) References Cited

U.S. PATENT DOCUMENTS

| | | | |
|---|---|---|---|
| 2009/0281718 | A1 | 11/2009 | Gibran et al. |
| 2018/0188044 | A1* | 7/2018 | Wheeler ............... G05D 1/0088 |
| 2018/0188059 | A1* | 7/2018 | Wheeler ................. G06T 17/05 |
| 2019/0049990 | A1 | 2/2019 | Jafari Tafti et al. |
| 2019/0266179 | A1* | 8/2019 | Wheeler ............... G05D 1/0088 |
| 2020/0050205 | A1* | 2/2020 | McClelland ........... G01C 21/20 |
| 2020/0166945 | A1* | 5/2020 | Kim ....................... B60W 50/00 |

FOREIGN PATENT DOCUMENTS

| | | |
|---|---|---|
| CN | 105164496 A | 12/2015 |
| CN | 107886461 A | 4/2018 |
| CN | 108280154 A | 7/2018 |
| CN | 110807075 A | 2/2020 |
| JP | 7167876 B2 * | 11/2022 .......... B60W 60/001 |

OTHER PUBLICATIONS

Tencent Technology, IPRP, PCT/CN2020/098573, Mar. 1, 2022, 5 pgs.
Extended European Search Report, EP20857838.5, Apr. 7, 2022, 7 pgs.
Tencent Technology, European Office Action, EP Patent Application No. 20857838.5, Jun. 1, 2023, 6 pgs.
Tencent Technology, ISR, PCT/CN2020/098573, Sep. 28, 2020, 2 pgs.
Tencent Technology, European Office Action, EP Patent Application No. 20857838.5, Oct. 23, 2024, 2 pgs.

* cited by examiner

| Longitude and latitude 0 | Longitude and latitude 1 | Longitude and latitude 2 | Longitude and latitude 3 | Longitude and latitude 4 | ... |
|---|---|---|---|---|---|

| Center point |
|---|

+

| Offset 0 | Offset 1 | Offset 2 | Offset 3 | Offset 4 | ... |
|---|---|---|---|---|---|

FIG. 10

MAP DATA QUERY METHOD AND APPARATUS, COMPUTER DEVICE, AND STORAGE MEDIUM

CROSS-REFERENCE TO RELATED APPLICATIONS

This application is a continuation application of PCT Patent Application No. PCT/CN2020/098573, entitled "MAP DATA QUERY METHOD AND APPARATUS, COMPUTER DEVICE, AND STORAGE MEDIUM" filed on Jun. 28, 2020, which claims priority to Chinese Patent Application No. 201910819012.X, entitled "MAP DATA QUERY METHOD AND APPARATUS, COMPUTER DEVICE, AND STORAGE MEDIUM" and filed with the China National Intellectual Property Administration on Aug. 30, 2019, all of which are incorporated herein by reference in their entireties.

FIELD OF THE TECHNOLOGY

This application relates to the field of computer technologies, further to the field of map technologies, and in particular, to a map data query method and apparatus, a computer device, and a storage medium.

BACKGROUND OF THE DISCLOSURE

With the rapid development of science and technology, various technologies emerge one after another, and map technologies are applied increasingly widely. For example, in a vehicle travel process, map data needs to be queried and used, to provide accurate information for traveling of the vehicle.

In a conventional method, full map data needs to be stored in a vehicle terminal. In a vehicle travel process, the full map data needs to be preloaded, and corresponding map data is then queried from the full map data. Apparently, in the conventional method, system memory resources need to be excessively consumed. Moreover, this approach of preloading the full map data into the vehicle cannot guarantee the freshness of the map data, which is often a critical requirement of many applications such as autonomous driving or navigation of the vehicle based on the full map data.

SUMMARY

According to various embodiments provided in this application, a map data query method and apparatus, a computer device, and a storage medium are provided.

According to an aspect of this application, a map data query method is provided, performed by a computer device, the method including:
  obtaining a current position of a vehicle;
  requesting map data matching the current position from a cloud database;
  caching the requested map data returned from the cloud database locally;
  constructing a real-time spatial index of the locally-cached map data according to road elements in the locally-cached map data;
  in response to a query request transmitted by an application layer associated with the vehicle, querying the locally-cached map data at which the query request is aimed according to the real-time spatial index to generate a query result; and returning the query result to the application layer.

According to another aspect of this application, a map data query apparatus is provided, disposed in a computer device, the apparatus including:
  an obtaining module, configured to obtain a current position of a vehicle;
  a loading and caching module, configured to: request map data matching the current position from a cloud database; cache the requested map data returned from the cloud database locally; and construct a real-time spatial index of the locally-cached map data according to road elements in the locally-cached map data; and
  a query module, configured to, in response to a query request transmitted by an application layer associated with the vehicle, query the locally-cached map data at which the query request is aimed according to the real-time spatial index to generate a query result and return the query result to the application layer.

According to still another aspect of this application, a computer device is provided, including a memory and one or more processors, the memory storing computer-readable instructions, the computer-readable instructions, when executed by the one or more processors, causing the computer device to perform the operations of the map data query method according to the embodiments of this application.

According to still another aspect of this application, one or more non-transitory computer-readable storage media are provided, storing computer-readable instructions, the computer-readable instructions, when executed by one or more processors, causing the one or more processors to perform the operations of the map data query method according to the embodiments of this application.

Details of one or more embodiments of this application are provided in the accompanying drawings and descriptions below. Based on the specification, the accompanying drawings, and the claims of this application, other features, objectives, and advantages of this application become clearer.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other accompanying drawings from these accompanying drawings without creative efforts.

FIG. 10 is a schematic diagram of coordinate system conversion according to an embodiment.

DESCRIPTION OF EMBODIMENTS

To make the objectives, technical solutions, and advantages of this application clearer, the following further describes this application in detail with reference to the accompanying drawings and the embodiments. It is to be understood that the specific embodiments described herein are merely used to explain this application but are not intended to limit this application.

Figure 1:
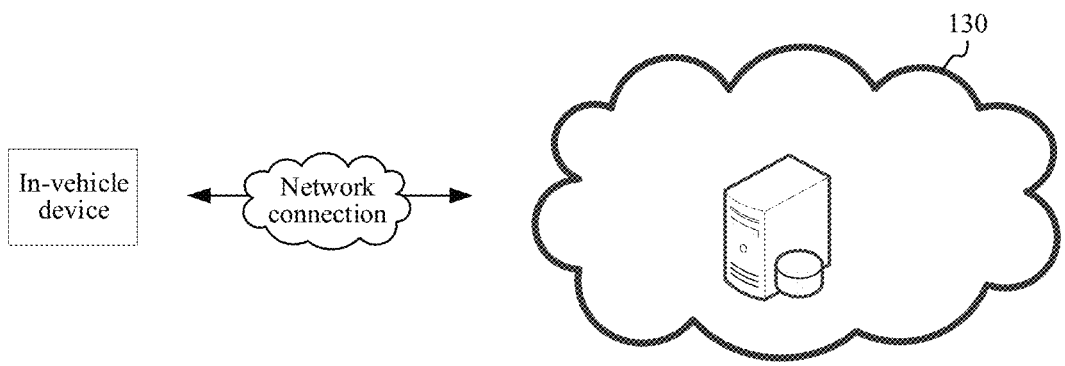
FIG. 1 is a diagram of an application scenario of a map data query method according to an embodiment.

FIG. 1 is a diagram of an application scenario of a map data query method according to an embodiment. Referring to FIG. 1, the application scenario includes an in-vehicle device 110 and a cloud database 120 that are connected by a network. The in-vehicle device 110 is a device disposed in a vehicle and providing services for traveling of the vehicle. It may be understood that, the in-vehicle device 110 may be a device fixedly disposed in a vehicle, such as an on-board device. The in-vehicle device 110 may alternatively be a mobile terminal disposed in a vehicle when the vehicle travels. The mobile terminal may include at least one of a mobile phone, a tablet computer, a notebook computer, a personal digital assistant, and a wearable device. The cloud database 120 may be implemented by using an independent computer or a computer cluster including a plurality of physical computers.

The in-vehicle device 110 may obtain a current position of a vehicle, and request map data matching the current position from the cloud database 120. The in-vehicle device 110 may cache the requested map data locally, and construct a spatial index of the map data locally according to road elements in the map data. In a case that a query request transmitted by an application layer is obtained, the in-vehicle device 110 may query map data at which the query request is aimed locally according to the spatial index. The application layer includes applications used for implementing a vehicle travel function in the in-vehicle device 110.

Figure 2:
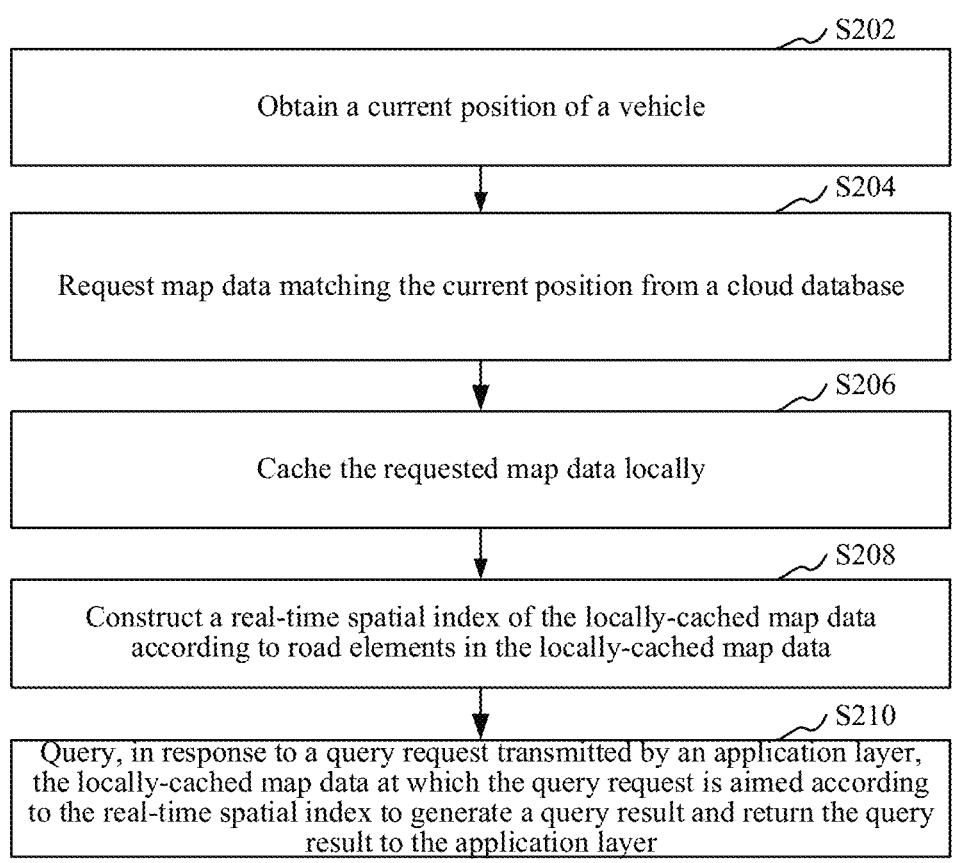
FIG. 2 is a schematic flowchart of a map data query method according to an embodiment.

FIG. 2 is a schematic flowchart of a map data query method according to an embodiment. The map data query method in this embodiment is applicable to a computer device, and a description is made mainly by using an example in which the computer device is the in-vehicle device 110 in FIG. 1. Referring to FIG. 2, the method specifically includes the following steps:

S202. Obtain a current position of a vehicle.

The current position is a position that the vehicle is currently in.

In an embodiment, the in-vehicle device may obtain a current position of a vehicle obtained through positioning from an application layer. Specifically, the application layer of the in-vehicle device has a positioning function, and the application layer obtains the current position of the vehicle through positioning.

In other embodiments, the in-vehicle device may alternatively obtain the current position of the vehicle from a dedicated positioning device. The dedicated positioning device is a device dedicated to positioning. It may be understood that, a manner in which the in-vehicle device obtains the current position of the vehicle is not limited.

In an embodiment, the in-vehicle device is provided with a map data engine. The in-vehicle device may obtain, by using the map data engine, the current position of the vehicle positioned by the application layer. It may be understood that, the in-vehicle device may directly obtain the current position of the vehicle from the application layer by using the map data engine.

Alternatively, the in-vehicle device may indirectly obtain the current position of the vehicle from the application layer. For example, the application layer may transmit the positioned current position to a corresponding map toolkit, and the map toolkit transmits the current position to the map data engine.

An engine is a core component for developing a program or a system. The map data engine is a core component of a map data query system. The map data query system is a system providing a map data query service, namely, a system implementing the map data query method in the embodiments of this application.

In an embodiment, the map data engine may be a high-precision map data engine.

High-precision map data is used for implementing lane-level positioning. It may be understood that, compared with a conventional road network map, in the high-precision map data, geometric descriptions of each lane line in roads are added, and descriptions of accurate and fine geometric information of all road elements such as curbs, guard rails, traffic lights, and sign boards are added, thereby implementing lane-level positioning.

Figure 3:
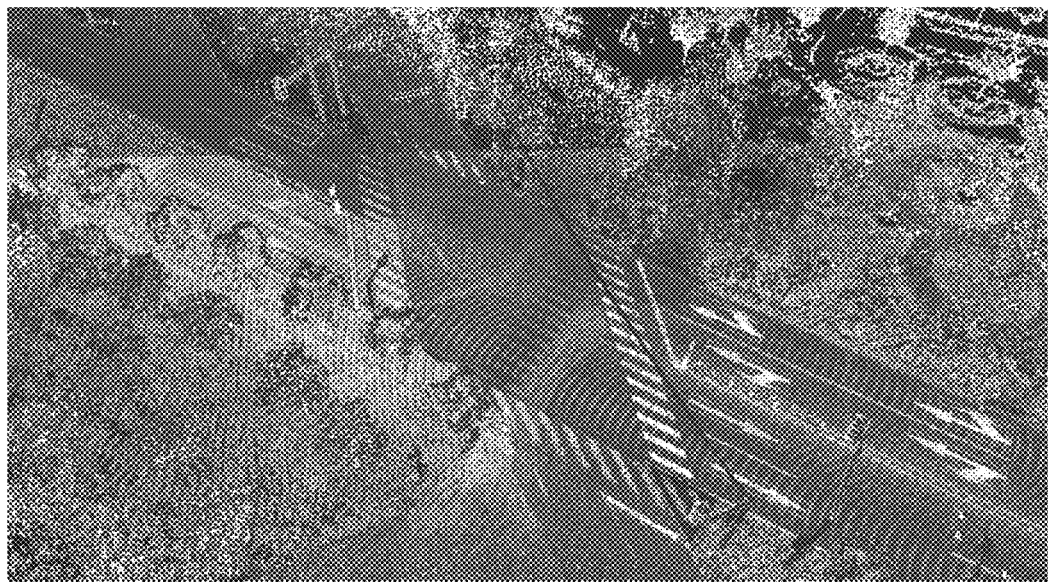
FIG. 3 is a schematic diagram of high-precision map data according to an embodiment.
Figure 4:
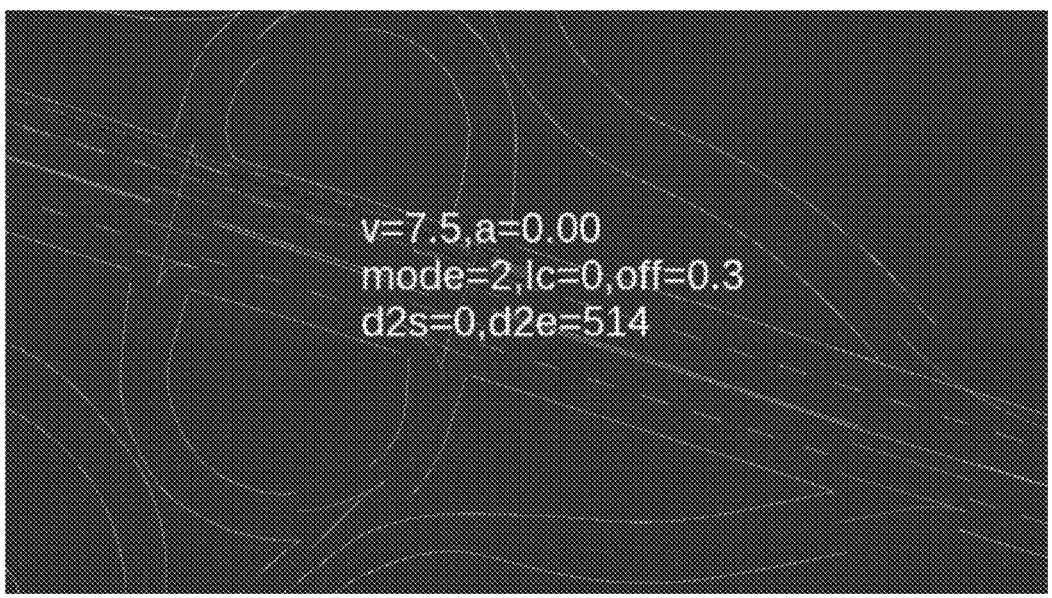
FIG. 4 is a schematic diagram of lane-level positioning according to an embodiment.

FIG. 3 is a schematic diagram of high-precision map data according to an embodiment. Abundant road elements such as lane lines and zebra crossings may be seen from the figure. Lane-level positioning may be implemented through the high-precision map data. FIG. 4 is a schematic diagram of lane-level positioning according to an embodiment. Numbers in FIG. 4 are lane information for positioning and guidance.

The map toolkit refers to a map software development kit (SDK), and is configured to receive map data delivered by the map data engine and provide services such as query and data returning for an upper application layer.

In an embodiment, after the current position of the vehicle is obtained, the in-vehicle device may further update a travel trajectory of the vehicle according to the current position.

S204. Request map data matching the current position from a cloud database.

The cloud database is a database disposed in a cloud.

The map data matching the current position refers to map data meeting a travel requirement of the vehicle at the current position. That is, the map data matching the current position may provide sufficient map data for the vehicle traveling at the current position to ensure normal traveling of the vehicle.

It may be understood that, the cloud database stores full map data. The full map data is all map data. The in-vehicle device may request the map data matching the current position from the cloud database. After the request is received, the cloud database may select the map data matching the current position from the stored full map data, and return the selected map data to the in-vehicle device. It may be understood that, the map data matching the current position is local map data rather than the full map data.

The in-vehicle device may directly request the matching map data from the cloud database according to the current position. The in-vehicle device may alternatively combine the current position with other information (for example, path planning information), and request the map data matching the current position from the cloud database. This is not limited.

In an embodiment, the in-vehicle device may request the map data matching the current position from the cloud database by using the map data engine.

S206. Cache the requested map data returned from the cloud database locally.

Being local herein refers to being local relative to the in-vehicle device.

In an embodiment, the requested map data is high-precision map data and may be used for implementing lane-level positioning. That is, road elements included in the obtained map data may be used for implementing lane-level positioning.

The road element refers to an information element that can reflect a road feature. The road feature may include shape features of a road, road traffic markings in a road (namely, on a road surface of the road), and traffic environment features of a road.

The shape features of a road include one piece of or a combination of two or more pieces of information such as a profile, a width, and a direction of the road. The traffic environment features of a road refer to information related to traffic on the road. The traffic environment features of a road include at least one of a curb, a guard rail, a sign board, and a traffic light.

The road traffic markings refer to identifiers using lines, arrows, texts, object markings, raised pavement markers, and delineators on a road surface of a road to pass traffic information such as guidance, limitation, and warning to traffic participants. The road traffic markings include lane information and ground image-text markings such as arrows and texts on the ground. The lane information includes one of or a combination of two or more of a quantity of lanes, a width of a lane, a geometric shape of a lane line, and attribute information of a lane line. The attribute information of a lane line includes whether the lane line is a solid line or a dashed line, a color of the lane line, and a thickness of the lane line.

In other embodiments, the requested map data may alternatively be a conventional road network map, namely, non-high-precision map data that cannot implement lane-level positioning. This is not limited.

Specifically, the in-vehicle device may abstractly represent the road elements in the map data, and record a connection relationship among lane lines through a topological relationship. The in-vehicle device may cache the abstractly represented road elements and the recorded topological relationship locally, to cache the requested map data. It may be understood that abstract representation refers to representation of road elements in a real environment.

It may be understood that, the connection relationship among lane lines may be used for representing a traffic state between roads.

In an embodiment, the road elements in the map data may be abstractly represented into point objects, line objects, and plane objects. For example, a traffic light is a point object, a lane line and a guard rail are line objects, and a zebra crossing and a traversable region are plane objects.

In an embodiment, the in-vehicle device may cache the requested map data locally by using the map data engine.

In an embodiment, the map data engine may include a data model layer. The data model layer is used for abstractly representing the road elements. The in-vehicle device may abstractly represent the road elements in the map data by using the data model layer of the map data engine.

In another embodiment, the in-vehicle device may alternatively cache the requested map data locally by using map toolkits disposed corresponding to applications in the application layer. This is not limited provided that the requested map data may be cached locally.

It may be understood that, when the requested map data is cached locally, a storage format of map data obtained from the cloud and a storage format of local data may be different. In this case, format conversion may be performed on the requested map data according to the storage format of the local data, to locally cache map data obtained after the format conversion.

It may be understood that, the in-vehicle device caches the requested map data locally in a hash mapping manner.

S208. Construct a real-time spatial index of the locally-cached map data according to road elements in the locally-cached map data.

The spatial index provides an index relationship for querying map data.

It may be understood that, the in-vehicle device may construct a unique spatial index of the map data locally according to the road elements in the map data. The in-vehicle device may alternatively set spatial indexes in different forms for different types of query requirements on the application layer. A form of the spatial index may be a grid index or a tree index.

In an embodiment, the in-vehicle device may further establish an association index among the road elements. The association index is used for representing an association relationship among the road elements. For example, when data of a traffic light related to a current lane is recorded, where the lane and the traffic light belong to different road elements, and the record is used for representing an association relationship between the lane and the traffic light. In an embodiment, the association index may be implemented in the form of a hash table. That is, road elements having an association relationship are recorded in a hash table.

In an embodiment, the in-vehicle device may construct the spatial index of the map data locally according to the road elements in the map data by using the map data engine.

In an embodiment, the map data engine may include a data index layer. The data index layer is used for generating the spatial index of the map data. The in-vehicle device may construct the spatial index of the map data locally by using the data index layer of the map data engine.

S210. When a query request transmitted by an application layer is obtained, query the locally-cached map data at which the query request is aimed according to the real-time spatial index to generate a query result and return the query result to the application layer.

Applications included in the application layer are used for implementing a vehicle travel function. It may be understood that, the applications included in the application layer are also disposed in the in-vehicle device.

In an embodiment, the application layer may be a self-driving application layer. The self-driving application layer includes a self-driving application used for implementing a vehicle self-driving function. That is, the map data query method in the embodiments of this application is applicable to a self-driving scenario, to provide preparatory map data for self-driving in time.

Specifically, in a vehicle travel process, the application layer may need to query map data, and when a query request transmitted by the application layer is obtained, the in-vehicle device may query map data at which the query request is aimed from a local cache according to the spatial index constructed locally.

It may be understood that, when the in-vehicle device constructs spatial indexes in different forms locally, the in-vehicle device may analyze a type of the query request transmitted by the application layer, and query the map data at which the query request is aimed locally according to a spatial index corresponding to the type. In this way, the query efficiency may be improved.

In an embodiment, the in-vehicle computer device may query the locally-cached map data at which the query request is aimed according to the established real-time spatial index by using the map data engine.

In another embodiment, the in-vehicle computer device may alternatively determine a map toolkit disposed corresponding to an application initiating the query request in the application layer, and query the map data at which the query request is aimed locally according to the established spatial index by using the map toolkit.

Figure 5:
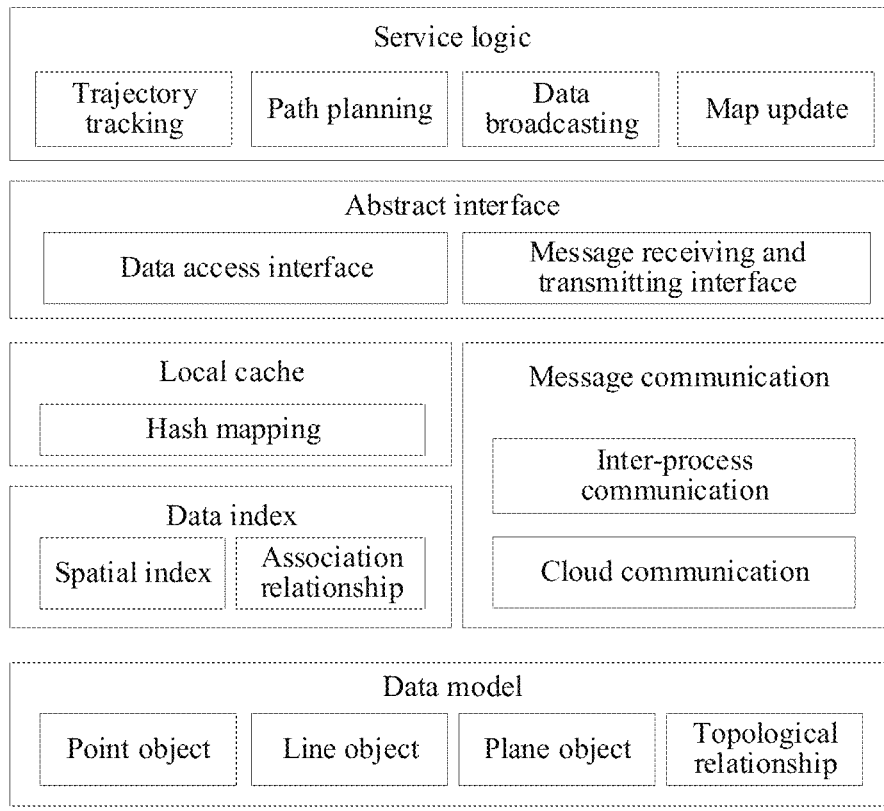
FIG. 5 is an architectural diagram of a map data engine according to an embodiment.

FIG. 5 is an architectural diagram of a map data engine according to an embodiment. Referring to FIG. 5, the map data engine may include a data model layer, a data index layer, a local cache layer, a message communication layer, an abstract interface layer, and a service logic layer. The map data engine may abstractly represent road elements in requested map data into point objects, line objects, and plane objects by using the data model layer, and record a traffic state between roads through a topological relationship. The map data engine may establish a spatial index by using the data index layer, and record an association relationship among the road elements. The map data engine may cache the map data in the local cache layer by using the data model layer and the data index layer. In the local cache layer, the cached map data may be efficiently stored in a hash mapping manner, and during map data query, map data may be queried quickly. The message communication layer includes inter-process communication and cloud communication. The inter-process communication includes encapsulated communication interfaces and communication protocols with map toolkits (namely, map SDKs). The cloud communication includes an encapsulated communication interface with a cloud database. The abstract interface layer mainly encapsulates an access interface and a message receiving and transmitting interface of the map data engine for local data. The service logic layer implements corresponding service functions by using various interfaces provided by the abstract interface layer, for example, related functions such as trajectory tracking, path planning, data broadcasting, and map update. It may be understood that, the trajectory tracking means that the map data engine may update a travel trajectory of a vehicle according to a current position of the vehicle. The path planning means that the map data engine may receive a path planning request and perform path planning processing. The data broadcasting means that the map data engine may deliver map data to map toolkits. The map update means that a high-precision map data engine may receive abnormal map data returned by an application layer, and return the abnormal map data to the cloud database, to update map data.

In the foregoing map data query method, the map data matching the current position of the vehicle is requested from the cloud database, the requested map data is cached locally, and the spatial index of the map data is constructed locally according to the road elements in the map data. This method is equivalent to dynamically caching the map data locally according to the current position rather than fixedly storing full map data. In a case that a query request transmitted by an application layer is obtained, map data at which the query request is aimed is queried locally according to the spatial index. The map data matching the current position is cached locally, so that the map data cached locally can meet a query requirement of a vehicle in a current travel process. Therefore, compared with storing the full map data in the conventional method, dynamically caching local map data locally according to the current position can save storage resources of a system on the premise of meeting a current travel requirement of a vehicle.

In addition, dynamically loading map data from the cloud database can ensure the freshness of the map data, thereby improving the accuracy of queried map data. In addition, map data query processing is independent of the application layer of vehicle traveling, thereby reducing coupling.

In an embodiment, step S204 includes: obtaining path planning information planned in advance; determining information about to-be-passed paths within a preset range in front of the current position from the path planning information; and requesting map data matching the information about to-be-passed paths from the cloud database.

The path planning information is information about a vehicle travel path planned in advance.

It may be understood that, the path planning information may be planned in advance by the in-vehicle device, or may be planned in advance by the cloud database.

In an embodiment, the path planning information is a vehicle travel path planned according to a preset point of interest. The point of interest is a point that needs to be passed in a vehicle travel process.

In an embodiment, a planning step of the path planning information includes: obtaining a path planning request transmitted by the application layer; transmitting a point of interest carried in the path planning request to the cloud database; caching path planning information returned by the cloud database and made for the point of interest locally; and returning the path planning information to the application layer.

Specifically, a user may input a point of interest into the application layer, and the application layer may generate a path planning request, where the path planning request carries the point of interest. The in-vehicle device may obtain the path planning request by using the map data engine, and transmit the point of interest carried in the path planning request to the cloud database. The cloud database may make path planning information according to the point of interest. The path planning information includes the point of interest. The cloud database may return the made path planning information to the map data engine in the in-vehicle device, and the map data engine returns the path planning information to the application layer.

It may be understood that, the map data engine may directly obtain the path planning request transmitted by the application layer. The map data engine may alternatively obtain the path planning request by forwarding the map toolkits disposed corresponding to the applications in the application layer. That is, an application generating the path planning request in the application layer may transmit the path planning request to a map toolkit disposed for the application, the map toolkit forwards the path planning request to the map data engine, and the map data engine may transmit the point of interest carried in the path planning request to the cloud database, to request the cloud database to make the path planning information.

Similarly, in an embodiment, the in-vehicle device may deliver, by using the map data engine, the path planning information returned by the cloud database to the application layer. It may be understood that, a high-precision map data engine may directly deliver the path planning information to the application layer. The high-precision map data engine may alternatively deliver the path planning information to the map toolkit, and the map toolkit returns the path planning information to the application initiating the path planning request in the application layer.

It may be understood that, when there is path planning information planned in advance, the step of obtaining the path planning information planned in advance and subsequent steps are performed.

In an embodiment, before the path planning information planned in advance is obtained, the in-vehicle device may first detect whether there is path planning information planned in advance. When there is path planning information planned in advance, the path planning information planned in advance is obtained and subsequent steps are performed; and when there is no path planning information planned in advance, map data may be directly requested from the cloud database according to the current position.

In an embodiment, after the path planning information returned by the cloud database is obtained, the in-vehicle device may update a system state to a path planning state. It may be understood that, the path planning state is used for indicating that a path has been planned. Therefore, the in-vehicle device may detect whether the system state is the path planning state (routing state) currently, and if yes, it indicates that there is path planning information planned in advance; and if no, it indicates that there is no path planning information planned in advance.

In an embodiment, before whether the system state is a path planning state currently is detected, the in-vehicle device may further determine whether there is a need to request map data from the cloud database again, and perform the step of detecting whether the system state is the path planning state currently if it is determined that there is a need to request map data from the cloud database again.

In an embodiment, when there is no path planning information, the in-vehicle device may request map data corresponding to a region within a preset range to the current position from the cloud database. It may be understood that, the map data corresponding to the region within the preset range to the current position is equivalent to road information around the vehicle.

When there is path planning information planned in advance, the in-vehicle device may determine information about to-be-passed paths within the preset range in front of the current position from the path planning information. That is, information about traversable paths within the preset range in front of a traveling vehicle is determined. It may be understood that, the information about to-be-passed paths is used for representing information about paths that need to be traveled within the preset range in front of a traveling vehicle. After the information about to-be-passed paths is determined, the in-vehicle device needs to query map data matching the information about to-be-passed paths from the cloud database.

The map data matching the information about to-be-passed paths refers to map data meeting a travel requirement of a vehicle on the to-be-passed paths. That is, the map data matching the information about to-be-passed paths can provide sufficient map data for a vehicle subsequently traveling on the to-be-passed paths, to ensure normal traveling of the vehicle on the to-be-passed paths. It may be understood that, the map data matching the information about to-be-passed paths is equivalent to road information of the to-be-passed paths in front.

In the foregoing embodiments, the information about to-be-passed paths is determined according to the path planning information and the current position, and map data matching the to-be-passed paths is loaded. In this way, map data may be loaded in a more targeted and accurate manner.

In an embodiment, the method further includes: obtaining a reference travel position matching map data cached last time; determining a difference between the current position and the reference travel position; and performing, when the difference is greater than a preset difference threshold, step S204 of requesting map data matching the current position from a cloud database.

The reference travel position is a travel position matching the map data cached last time.

It may be understood that, the reference travel position is a current position of the vehicle during last caching. During last caching, the in-vehicle device may request map data matching the reference travel position from the cloud database.

For ease of understanding the reference travel position, a description is made by using an example. For example, during first caching, if a current position of the vehicle is P1, map data matching P1 is requested from the cloud database during the first caching. When it is determined whether to perform second caching, P1 is a reference travel position, a current position may be obtained, and the current position is compared with P1, to determine whether to request map data of the second caching from the cloud database.

Specifically, the in-vehicle device may obtain the reference travel position matching the map data cached last time, and determine a difference between the current position and the reference travel position. When the difference is greater than a preset difference threshold, it indicates that a distance between the current position and the reference travel position when the map data is cached last time is excessively large, the map data cached last time probably cannot meet a travel requirement of the current position. Therefore, the in-vehicle device may request the map data matching the current position again from the cloud database.

In the foregoing embodiments, when the difference between the current position and the reference travel position is greater than the preset difference threshold, the in-vehicle device is triggered to request the map data matching the current position from the cloud database, thereby avoiding resource waste caused by requesting map data from the cloud database excessively frequently.

In an embodiment, the method further includes: delivering the map data cached this time to map toolkits for caching, the map toolkits being disposed locally respectively corresponding to applications in the application layer. Step S210 of querying, when a query request transmitted by an application layer is obtained, map data at which the query request is aimed locally according to the spatial index includes: querying, when a map toolkit receives a query request transmitted by a corresponding application, map data at which the query request is aimed from the map data cached in the map toolkit.

The map toolkit refers to a map software development kit (SDK), and is configured to receive map data delivered by the map data engine and provide services such as query and data returning for an upper application layer.

It may be understood that, the applications in the application layer are disposed in the in-vehicle device. Corresponding map toolkits are respectively disposed in the in-vehicle device in advance for the applications. That is, the map toolkits are disposed in the in-vehicle device locally and correspond to the applications in the application layer respectively.

In an embodiment, the map toolkits and the applications may be in a one-to-one correspondence. That is, each application has a corresponding map toolkit. In other embodiments, one map toolkit may correspond to a plurality of applications.

Specifically, in step S206, the in-vehicle device may cache the requested map data locally by using the map data engine. Further, the in-vehicle device may deliver the map data to the map toolkits for caching by using the map data engine.

It may be understood that, in this case, when the map data requested from the cloud database is the map data matching the information about to-be-passed paths, the map data delivered to the map toolkits is the map data matching the information about to-be-passed paths (namely, the road information of the to-be-passed paths in front). When the map data requested from the cloud database is the map data determined directly according to the current position, the map data delivered to the map toolkits is the map data determined directly according to the current position (namely, road information around the vehicle).

In an embodiment, the method further includes: performing difference comparison between the map data cached this time and map data cached last time; and performing, when there is a difference between the map data cached this time and the map data cached last time, the operation of delivering the map data cached this time to map toolkits for caching.

Before the in-vehicle device delivers the map data cached this time by using the map data engine, the in-vehicle device may determine whether to deliver the map data.

It may be understood that, when map data is requested from the cloud database, even if it is determined according to a difference between travel positions that there is a need to request map data from the cloud database again, the map data requested twice is actually the same. For example, when a predicted difference threshold of the travel positions is excessively small, or the precision of map data requested from the cloud database is relatively low, even if there is a certain difference between the travel positions, the same map data is still obtained. In this case, to avoid resource waste caused by delivering the same map data to the map toolkits, the in-vehicle device may perform difference comparison between the map data cached this time and the map data cached last time by using the map data engine, and when there is a difference between the map data cached twice, it indicates that the map data changes, and the map data cached this time may be delivered to the map toolkits for caching.

Specifically, the in-vehicle device may obtain the map data cached last time locally by using the map data engine, and perform difference comparison between the map data cached this time and the map data cached last time; and deliver the map data cached this time to map toolkits for caching when there is a difference between the map data cached this time and the map data cached last time.

It may be understood that, the map data cached in each map toolkit is the same. In a case that a map toolkit receives a query request transmitted by a corresponding application, map data at which the query request is aimed is queried from the map data cached in the map toolkit.

In an embodiment, when the queried map data is received, the application layer may detect whether the queried map data is abnormal. When it is detected that the map data is abnormal, the abnormal map data may be fed back to the map toolkit, and the map toolkit may upload the abnormal map data to the map data engine in a manner of inter-process communication. The in-vehicle device may return the abnormal map data to the cloud database by using the map data engine. The cloud database may process the abnormal map data to modify the abnormal map data, and update the modified map data to map data stored in the cloud database, to make the modified map data correct.

Figure 6:
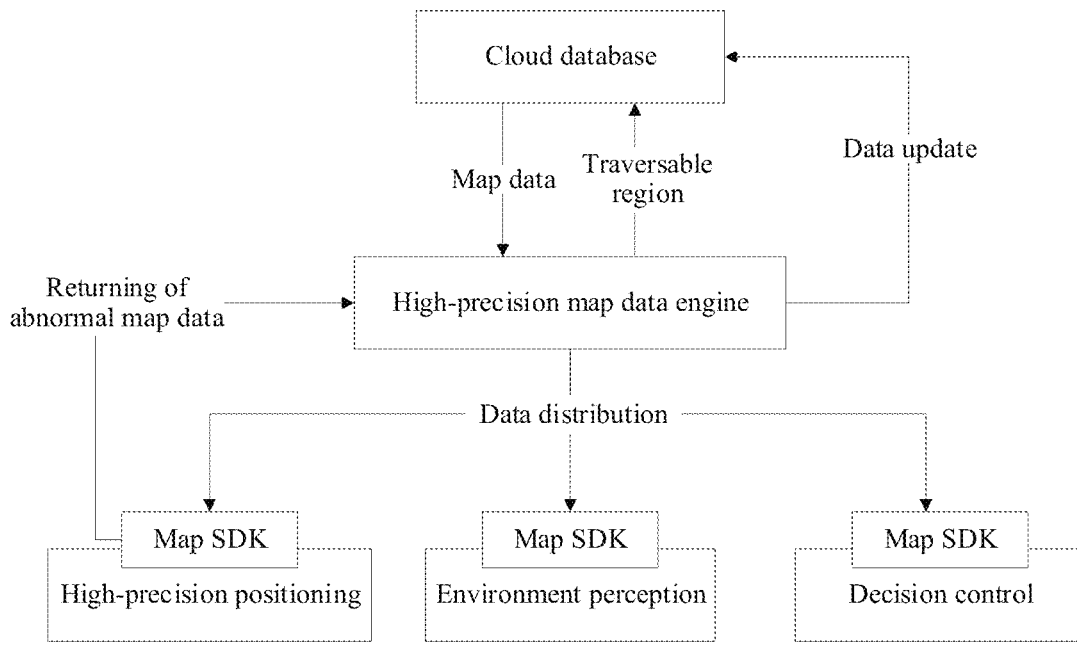
FIG. 6 is a diagram of a data stream of a map data query method according to an embodiment.

FIG. 6 is a diagram of a data stream of a map data query method according to an embodiment. In FIG. 6, a description is made by using an example in which the map data engine is a high-precision map data engine. High-precision positioning, environment perception, and decision control belong to applications of the application layer, and corresponding map SDKs (namely, the map toolkits) are disposed for the applications respectively. The high-precision map data engine may provide travel regions (namely, the current position of the vehicle or the information about to-be-passed paths) for the cloud database, and the cloud database may return map data to the high-precision map data engine. The high-precision map data engine may distribute the map data to the map SDKs for local caching. The applications such as high-precision positioning, environment perception, and decision control may query the map data from the corresponding map SDKs. When an application detects that the map data has an abnormality, the abnormal map data is returned to the high-precision map data engine. The high-precision map data engine may report the abnormal map data to the cloud database to update the map data.

In the foregoing embodiments, corresponding map toolkits are disposed for the applications, for each application to query the map data from a corresponding map toolkit without uniformly querying the map data from the map data engine, thereby improving the query efficiency.

Figure 7:
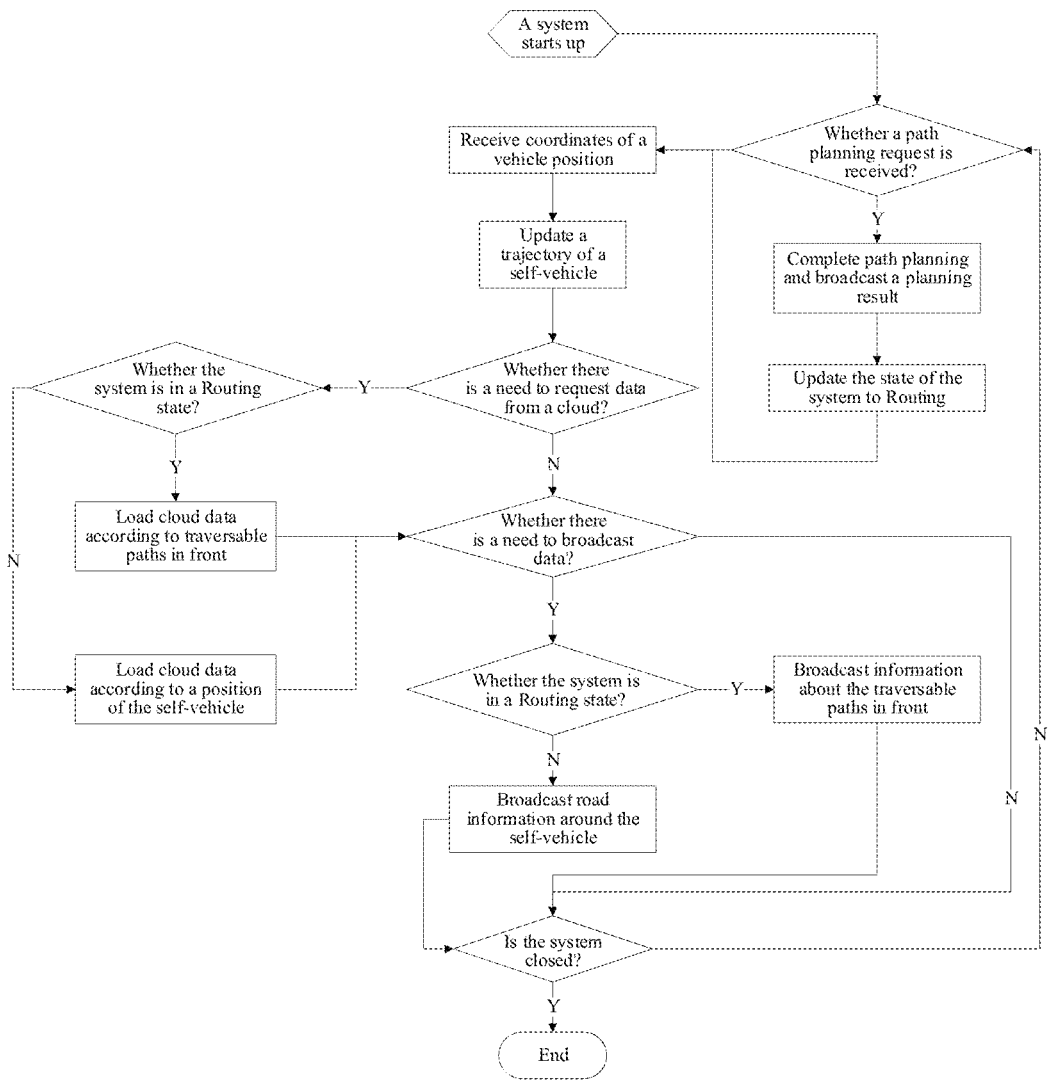
FIG. 7 is a simplified diagram of a procedure of requesting and delivering map data according to an embodiment.

FIG. 7 is a simplified diagram of a procedure of requesting and delivering map data according to an embodiment. Referring to FIG. 7, the procedure is mainly described by using a map data engine applicable to an in-vehicle device of a self-driving vehicle as an example. The self-vehicle in FIG. 7 is a short name of the "self-driving vehicle". The map data engine is a core component of a map data query system. The map data query system is configured to implement the map data query method in the embodiments of this application. A running frame rate of the entire map data query system is 10 fps. In each frame, whether there is a path planning request is determined first and a system state is updated based on the determination; and then, position coordinates of the vehicle (namely, the current position of the vehicle) are received, and it is determined whether there is a need to request data from a cloud and whether there is a need to broadcast the map data to the map toolkits. Specifically, after the map data query system is started, the high-precision map data engine may determine whether a path planning request is received, and if yes, request path planning from the cloud database. After path planning is completed, the map data engine may broadcast a planning result to the map toolkits, and update the system state to a Routing state (namely, a path planning state). The map data engine may receive the position coordinates of the vehicle (namely, the current position of the vehicle) and update a trajectory of the self-vehicle (namely, a travel trajectory of the self-driving vehicle). The map data engine may determine whether to request data from the cloud (namely, whether to request map data from the cloud database), and if yes, determine whether the system is in the Routing state. If yes, it indicates that there is path planning information, and the map data engine may determine traversable paths (namely, the information about to-be-passed paths) in front according to the path planning information, and load the data from the cloud (namely, request map data from the cloud database) according to the traversable paths in front; and if no, it indicates that there is no path planning information, and the map data engine may load the data from the cloud according to a position of the self-vehicle (namely, request map data from the cloud database according to the current position of the self-driving vehicle). After the requested map data is obtained, the map data engine may determine whether to broadcast the data (namely, whether to deliver the requested map data cached this time to the map toolkits), and if yes, when the system is in the Routing state, broadcast requested information about the traversable paths in front (namely, the map data matching the information about to-be-passed paths); and when the system is not in the Routing state, broadcast requested road information around the self-vehicle (namely, the map data corresponding to the region within the preset range to the current position of the self-driving vehicle). If it is determined that there is no need to broadcast the road information or broadcasting of the road information is completed, whether the system is closed may be determined, and the procedure ends if the system is closed; and if the system is not closed, whether a new path planning request is received is redetermined.

In an embodiment, the map toolkit includes a map agent layer, a data cache layer, an asynchronous loading layer, and an inter-process communication (IPC) layer.

The map agent layer is used for providing an encapsulated map query interface for the application layer. The data cache layer is the same as the map data engine, and is used for providing caching, index, and query interfaces for map data. The asynchronous loading layer is used for requesting map data from the map data engine, and loading the obtained map data into the data cache layer. The IPC layer is used for encapsulating communication protocols with the map data engine.

Figure 8:
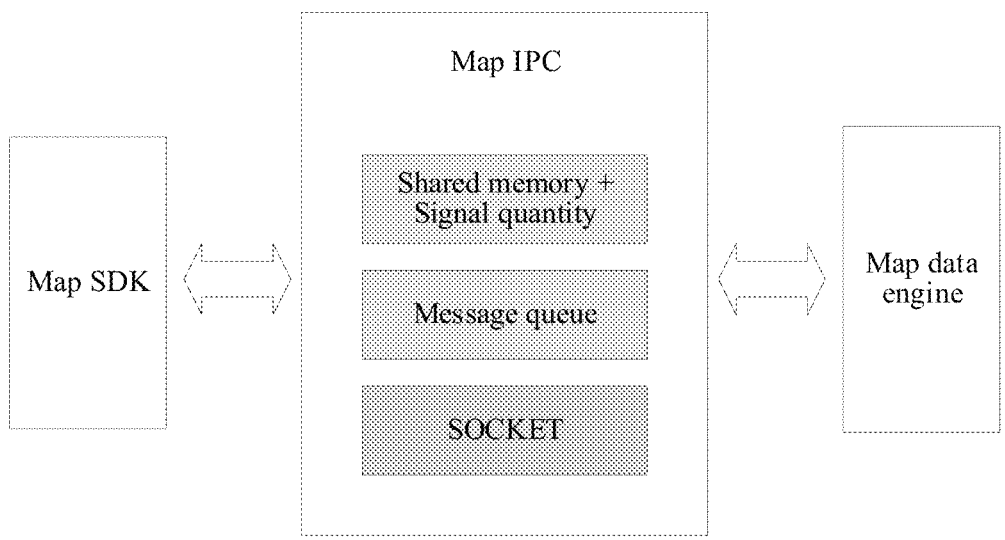
FIG. 8 is an architectural diagram of inter-process communication according to an embodiment.

FIG. 8 is an architectural diagram of inter-process communication according to an embodiment. Referring to FIG. 8, the IPC layer provides two forms of communication: one form is implemented through shared memory, signal quantity, and message queues and is mainly applicable to a self-driving system run by a single device (which means that a single in-vehicle device can meet a vehicle travel requirement), so as to ensure sufficiently high communication efficiency; and the other form is implemented in a socket manner and is mainly applicable to a self-driving system run by a plurality of devices (which means that a plurality of in-vehicle devices need to collaborate to meet a vehicle travel requirement), so as to ensure cross-machine communication. The map toolkit and the map data engine communicate with each other through the IPC layer.

Figure 9:
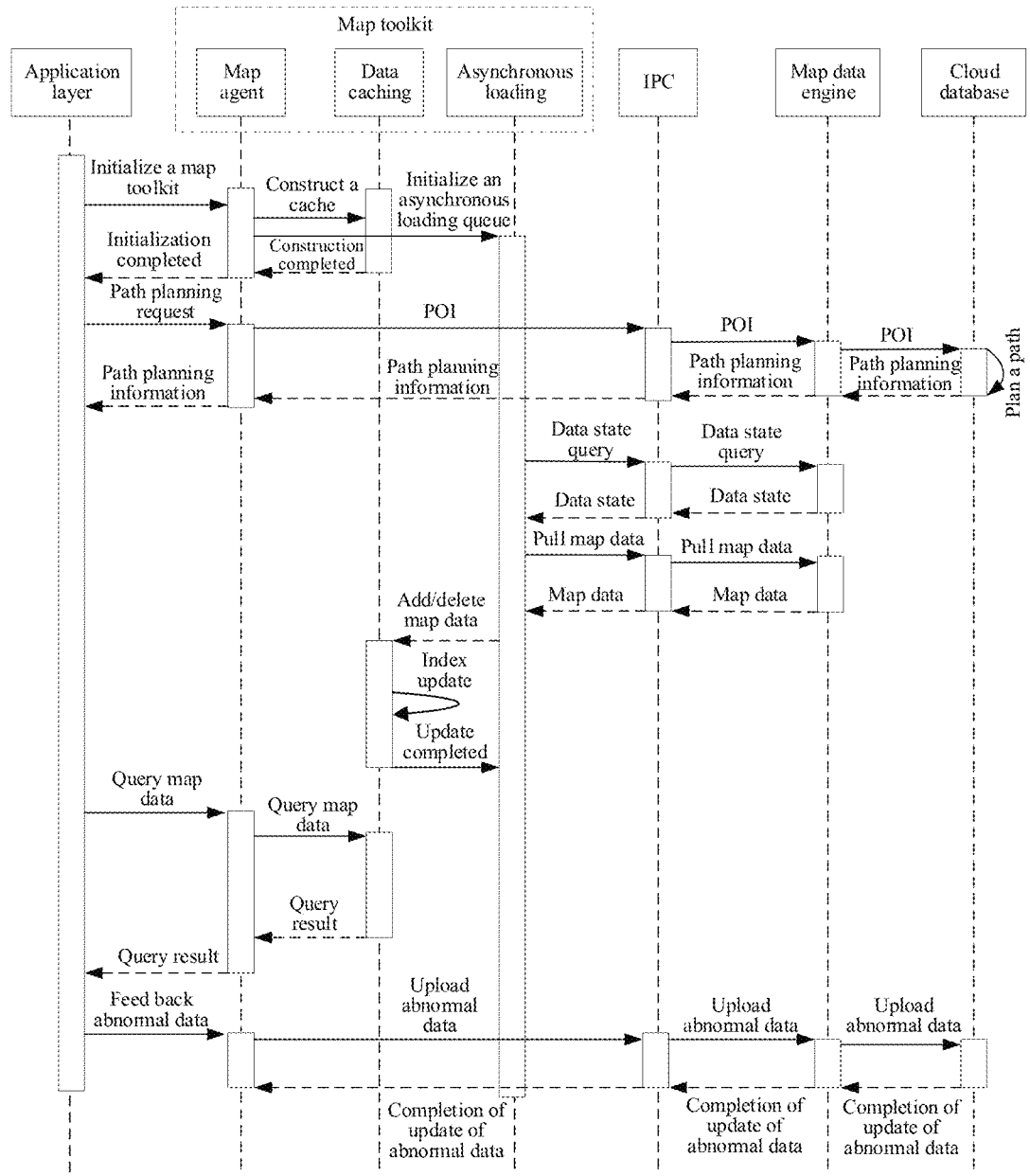
FIG. 9 is a sequence diagram of querying map data according to an embodiment.

FIG. 9 is a sequence diagram of querying map data according to an embodiment. Referring to FIG. 9, an application layer, a map toolkit, a map data engine, and a cloud database are included. It may be understood that, the application layer, the map toolkit, and the map data engine are all disposed in an in-vehicle device. The map toolkit includes a map agent layer, a data cache layer, and an asynchronous loading layer. The map toolkit and the map data engine communicate with each other through an inter-process communication (IPC) layer. Applications in the application layer may request to initialize map toolkits (namely, map SDKs) disposed correspondingly, and the map agent layer may construct the data cache layer and instruct the asynchronous loading layer to initialize an asynchronous loading queue. After the data cache layer is constructed, feedback is returned to the map agent layer, and the map agent layer feeds back completion of initialization to the application layer. The application layer transmits a path planning request to the map agent layer in the map toolkit, and the map agent layer transmits a point of interest (POI) carried in the path planning request to the map data engine through the IPC layer. The map data engine transmits the path planning request to the cloud database. The cloud database makes path planning information according to the POI and returns the path planning information to the map data engine. The map data engine transmits the path planning information to the map agent layer in the map toolkit through IPC. The map agent layer returns the path planning information to the application layer. The asynchronous loading layer in the map toolkit may perform data state query on the map data engine through IPC to query whether a data state is updated, namely, to query whether there is new map data. The map data engine returns the data state to the asynchronous loading layer through IPC. When the data state is updated, the asynchronous loading layer requests to pull map data from the map data engine through IPC. The map data engine delivers the map data to the asynchronous loading layer through IPC. The asynchronous loading layer adds map data to or deletes map data from the data cache layer according to the received map data. The data cache layer updates an index (namely, updates a spatial index) locally according to the new map data, and informs the asynchronous loading layer of completion of update. The application layer may request to query map data from the map toolkit, and the map agent layer in the map toolkit may query map data from the data cache layer of the map toolkit and return query results to the application layer sequentially. When the application layer detects that the map data has an abnormality, the application layer feeds back the abnormal map data to the map toolkit. The map agent layer in the map toolkit may upload the abnormal map data to the map data engine through IPC, and the map data engine reports the abnormal map data to the cloud database. The cloud database modifies the abnormal map data, and updates the modified map data to map data stored in the cloud database as correct map data. Further, the map data engine may inform the map agent layer after update of the map data is completed.

In an embodiment, the delivering the map data cached this time to map toolkits for caching includes: delivering the map data to the map toolkits; converting, when a coordinate system used by an application corresponding to a map toolkit is different from a coordinate system corresponding to the map data, coordinates of the map data into coordinates in the coordinate system used by the application by using the map toolkit; and caching map data obtained after the coordinate conversion in the map toolkit.

It may be understood that, original map data uses longitude and latitude coordinates (for example, WGS84 coordinates) in a storage process, and this coordinate system may not be suitable for some applications in the application layer to use directly.

A coordinate system used by an application refers to a coordinate system in which data that may be directly used by the application in the application layer is located.

Specifically, when a coordinate system used by an application corresponding to a map toolkit is different from the coordinate system corresponding to the map data, it indicates that after the map data is obtained, the application further needs to convert the map data into coordinates in a usable coordinate system, which leads to low usage efficiency of the map data, and consequently affects the vehicle travel performance. Therefore, the in-vehicle device may convert the coordinates of the map data into coordinates in the coordinate system used by the application by using the map toolkit. The in-vehicle device may cache map data obtained after the coordinate conversion in the map toolkit.

Coordinate systems used by different applications in the application layer may be different. Coordinate systems used by some applications may be the same as the coordinate system corresponding to the map data, and in this way, coordinate system conversion does not need to be performed.

In the foregoing embodiments, map data in different coordinate systems may be cached locally for different applications, thereby improving the efficiency of accessing the map data by the applications.

In an embodiment, the converting coordinates of the map data into coordinates in the coordinate system used by the application by using the map toolkit includes: converting longitude and latitude coordinates of points forming the road elements in the map data into coordinates in a topocentric coordinate system, the topocentric coordinate system being a spatial rectangular coordinate system using the current position as an origin; selecting, for each road element, a center point from points forming the road element; determining offsets of non-center points forming the road element from the center point; and determining coordinates of the non-center points according to coordinates of the center point in the topocentric coordinate system and the offsets corresponding to the non-center points.

The topocentric coordinate system is a spatial rectangular coordinate system using the current position of the vehicle as an origin. It may be understood that, coordinate axes of the topocentric coordinate system may be a travel direction, a direction perpendicular to the travel direction on a horizontal plane, and a direction perpendicular to the travel direction on a vertical plane.

It may be understood that, the road element in the map data is formed by points. Therefore, the in-vehicle device may convert the longitude and latitude coordinates of the points forming the road elements into coordinates in the topocentric coordinate system by using the map toolkit.

In an embodiment, by using the map toolkit, the in-vehicle device may first initially convert the longitude and latitude coordinates of the points forming the road elements in the map data into coordinates in a spherical coordinate system, and then convert the coordinates in the spherical coordinate system that are obtained through initial conversion into coordinates in the topocentric coordinate system.

For each road element, the in-vehicle device may select a center point from points forming the road element by using the map toolkit. Points other than the center point in the road element are non-center points. The in-vehicle device may determine offsets of the non-center points forming the road element from the center point by using the map toolkit. The in-vehicle device may determine coordinates of the non-center points according to coordinates of the center point in the topocentric coordinate system and the offsets corresponding to the non-center points. That is, the coordinates of the non-center points are represented by using the coordinates of the center point in the topocentric coordinate system and the offsets.

It may be understood that, in a travel process of a vehicle, the topocentric coordinate system needs to be changed continuously because a topocentric coordinate system established before is no longer applicable when the vehicle moves increasingly far. In this case, a new topocentric coordinate system needs to be established again by using a new current position of the vehicle as an origin again. For example, a topocentric coordinate system is first established by using a travel position P1 of a vehicle as an origin. As the vehicle travels, the topocentric coordinate system using P1 as an origin is no longer applicable since the vehicle is excessively far. In this case, a current position P2 of the vehicle needs to be obtained again, and a topocentric coordinate system is established again by using P2 as an origin.

FIG. 10 is a schematic diagram of coordinate system conversion according to an embodiment. Coordinates of points of road elements in original map data obtained from the cloud database are longitude and latitude coordinates, and coordinate system conversion is performed on the longitude and latitude coordinates of the points, to convert the longitude and latitude coordinates of the points into a form of a combination of a center point and an offset.

Compared with a center point, non-center points of the same road element are fixed, so that offsets are also fixed. Therefore, when the topocentric coordinate system is changed, the coordinates of the non-center points may be represented together, by only updating or converting coordinates of the center point in a new topocentric coordinate system, in the form of the coordinates of the center point in the new topocentric coordinate system and the offsets. In this way, the coordinates of the non-center points may be represented quickly and accurately, thereby reducing a calculation amount. In addition, the coordinates of the points after conversion conform to a Cartesian coordinate system, are spatial rectangular coordinates, and may be directly used by the applications in the application layer, thereby improving the usage efficiency of the map data.

In an embodiment, step S208 includes constructing grid indexes and/or tree indexes locally respectively according to the road elements in the map data. Step S210 of querying, when a query request transmitted by an application layer is obtained, map data at which the query request is aimed locally according to the spatial index includes: querying, when a positioning query request transmitted by the application layer is obtained, coordinates of a position at which the positioning query request is aimed locally according to the grid indexes; and/or querying, when an object query request transmitted by the application layer is obtained, information about a road element at which the object query request is aimed locally according to the tree indexes.

The grid index is an index structure in which a map region is divided into grids with the same size or different sizes by using horizontal lines and vertical lines and a spatial entity included in each grid is recorded. A query process of the grid index is to first calculate a grid in which an object to be queried is located, and then query the selected spatial entity in the grid quickly.

The tree index refers to a tree structure in which leaf nodes store pointers pointing to the map data. A target object may be searched for layer by layer by using tree indexes.

Specifically, the in-vehicle device may construct grid indexes and/or tree indexes locally respectively according to the road elements in the map data. It may be understood that, the grid index makes it convenient to position and query a specific object. The tree index makes it convenient to query a data range, for example, query elements within a certain range.

In an embodiment, step S208 includes constructing grid indexes locally according to the road elements in the map data. Step S210 includes: querying, when a positioning query request transmitted by the application layer is obtained, coordinates of a position at which the positioning query request is aimed locally according to the grid indexes.

In an embodiment, step S208 includes constructing tree indexes locally according to the road elements in the map data. Step S210 includes: querying, when an object query request transmitted by the application layer is obtained, information about a road element at which the object query request is aimed locally according to the tree indexes.

In an embodiment, step S208 includes constructing grid indexes and tree indexes locally respectively according to the road elements in the map data. Step S210 includes: querying, when a positioning query request transmitted by the application layer is obtained, coordinates of a position at which the positioning query request is aimed locally according to the grid indexes; and querying, when an object query request transmitted by the application layer is obtained, information about a road element at which the object query request is aimed locally according to the tree indexes.

In an embodiment, the in-vehicle device may query the coordinates of the position at which the positioning query request is aimed locally according to the grid indexes by using the map data engine. In other embodiments, when the map data engine delivers the map data to the map toolkits for caching, the in-vehicle device may query the coordinates of the position at which the positioning query request is aimed locally according to the grid indexes by using a map toolkit disposed corresponding to an application initiating the positioning query request.

In an embodiment, the in-vehicle device may query the information about the road element at which the object query request is aimed locally according to the tree indexes by using the map data engine. In other embodiments, when the map data engine delivers the map data to the map toolkits for caching, the in-vehicle device may query the information about the road element at which the object query request is aimed locally according to the tree indexes by using a map toolkit disposed corresponding to an application initiating the object query request.

In the foregoing embodiments, the in-vehicle device may establish different spatial index structures for different types of query requirements in advance, so as to perform querying by using corresponding spatial indexes for different types of query requests, thereby improving the search efficiency.

In an embodiment, the method further includes: recording abnormal map data not matching environment perception data and being in the map data, the environment perception data being data obtained by perceiving a real environment by the application layer; virtualizing the abnormal map data into virtual map data matching the environment perception data; transmitting the virtual map data to the application layer; and uploading the abnormal map data to the cloud database when the application layer detects that the virtual map data has no abnormality.

The virtual map data refers to map data obtained by modifying the requested map data according to the environment perception data.

It may be understood that, the map data requested from the cloud database is real map data, and the map data obtained by modifying the map data according to the environment perception data is virtual map data.

For ease of understanding the virtual map data, a description is made by using an example. It is assumed that in the original map data, no road sign exists at one position, while environment perception data obtained by perceiving a real environment by an environment perception application of the application layer indicates that a road sign exists at the position. In this case, this part of map data does not match the environment perception data and belongs to abnormal map data. Then, the in-vehicle device may virtualize a road sign at the position of the map data according to the environment perception data, and map data obtained after a road sign is virtualized is virtual map data.

Specifically, the application layer in the in-vehicle device may also perceive a real environment by using the environment perception application, to obtain the environment perception data. After querying the map data from a local cache, the application layer may perform matching between the environment perception data obtained by the application layer and the queried map data. In a case that the two pieces of data do not match, the application layer may determine the map data as abnormal map data. The application layer in the in-vehicle device may return the abnormal map data to the map data engine. The map data engine may virtualize the abnormal map data into virtual map data matching the environment perception data. That is, the map data engine may add missing map data to or delete redundant map data from the abnormal map data according to the environment perception data, to obtain the virtual map data.

The in-vehicle device may transmit the virtual map data to the application layer by using the map data engine. The application layer may detect the received virtual map data according to the environment perception data, to determine whether the virtual map data has an abnormality. The virtual map data matches the environment perception data. Therefore, if a function of the environment perception application of the application layer has no problem, it is detected that the virtual map data has no abnormality. If the function of the environment perception application of the application layer has a problem, it may be detected that the virtual map data has an abnormality. Therefore, when the application layer detects that the virtual map data has no abnormality, it indicates that the function of the environment perception application of the application layer has no problem, and then it is likely that the abnormal map data reported by the environment perception application actually has an abnormality. The map data engine may upload the abnormal map data to the cloud database, to report the abnormality. The cloud database may perform update processing according to the abnormal map data, to update the map data.

In an embodiment, the operation of virtualizing the abnormal map data into virtual map data matching the environment perception data is performed when abnormal map data reported in a plurality of consecutive frames is obtained. In a case that abnormal map data reported in a plurality of consecutive frames is not obtained and only one piece of abnormal map data is obtained, the abnormal map data may be directly reported to the cloud database.

It may be understood that the plurality of frames are at least two frames. When the environment perception application perceives that the abnormal map data exists in a plurality of frames, the environment perception application may have a problem, and whether the environment perception application has a problem may be verified in a manner of virtualizing the abnormal map data into virtual map data matching the environment perception data and transmitting the virtual map data to the environment perception application in the application layer for detection.

Figure 11:
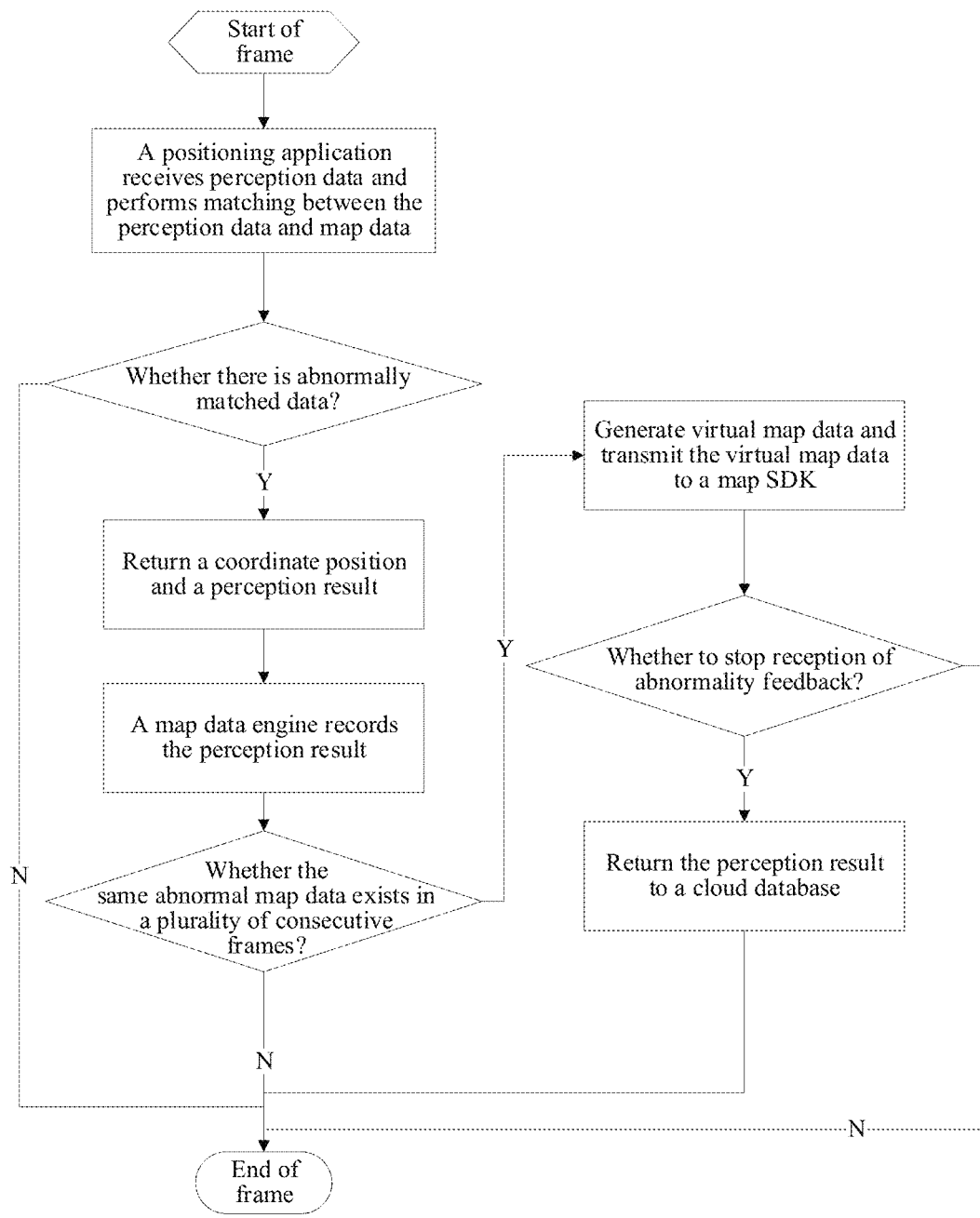
FIG. 11 is a schematic flowchart of updating map data according to an embodiment.

FIG. 11 is a schematic flowchart of updating map data according to an embodiment. At the beginning of each frame of running of the map data query system, a positioning application in the application layer receives environment perception data and performs matching between the environment perception data and map data. When map data abnormally matching the environment perception data exists, the positioning application returns a perception result indicating existence of the abnormal map data and a coordinate position to the map data engine. When no map data abnormally matching the environment perception data is detected, the running in this frame is ended. The map data engine may record the perception result. When abnormal map data exists in a plurality of consecutive frames, virtual map data is generated and transmitted to a map toolkit, and the map toolkit provides the virtual map data to the application layer to detect whether there is an abnormality. When reception of abnormality feedback is stopped, it indicates that detection on the virtual map data has no abnormality, indicating that the application layer has no abnormality, and a perception result indicating existence of the abnormal map data detected by the application layer is uploaded to the cloud database. The cloud database may perform update processing on the abnormal map data, to update the map data.

In the foregoing embodiments, after abnormal map data is detected, the abnormal map data is virtualized into virtual map data matching the environment perception data and the virtual map data is provided to the application layer, for the application layer to detect the virtual map data again to verify the accuracy of the application layer. When the application layer detects that the virtual map data has no abnormality, it is verified that the application layer has no problem. In this case, the abnormal map data is uploaded to the cloud database, to improve the accuracy of abnormality reporting.

Figure 12:
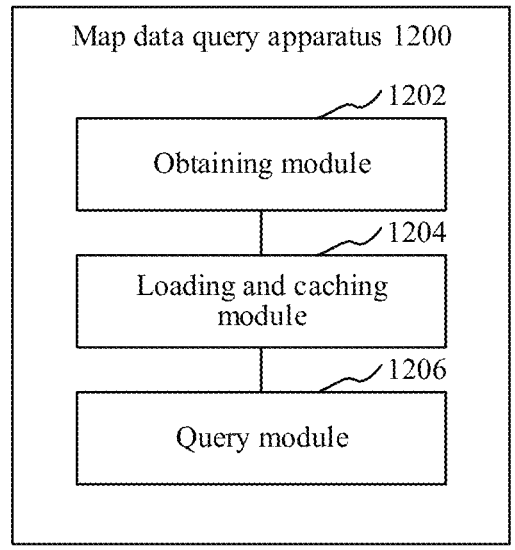
FIG. 12 is a block diagram of a map data query apparatus according to an embodiment.

As shown in FIG. 12, in an embodiment, a map data query apparatus 1200 is provided, disposed in the computer device in the foregoing embodiments. The apparatus 1200 includes: an obtaining module 1202, a loading and caching module 1204, and a query module 1206.

The obtaining module 1202 is configured to obtain a current position of a vehicle.

The loading and caching module 1204 is configured to: request map data matching the current position from a cloud database; cache the requested map data returned from the cloud database locally; and construct a real-time spatial index of the locally-cached map data according to road elements in the locally-cached map data.

The query module 1206 is configured to, in response to a query request transmitted by an application layer associated with the vehicle, query the locally-cached map data at which the query request is aimed according to the real-time spatial index to generate a query result and return the query result to the application layer.

In an embodiment, the loading and caching module 1204 is further configured to: obtain path planning information planned in advance; determine information about to-be-passed paths within a preset range in front of the current position from the path planning information; and request map data matching the information about to-be-passed paths from the cloud database.

In an embodiment, the apparatus 1200 further includes: a path planning module 1201, configured to: obtain a path planning request transmitted by the application layer; transmit a point of interest carried in the path planning request to the cloud database; cache path planning information returned by the cloud database and made for the point of interest locally; and return the path planning information to the application layer.

In an embodiment, the loading and caching module 1204 is further configured to: obtain a reference travel position matching map data cached last time; determine a difference between the current position and the reference travel position; and request, when the difference is greater than a preset difference threshold, the map data matching the current position from the cloud database.

In an embodiment, the loading and caching module 1204 is further configured to: deliver the map data cached this time to map toolkits for caching, the map toolkits being disposed locally respectively corresponding to applications in the application layer; and query, when a map toolkit receives a query request transmitted by a corresponding application, map data at which the query request is aimed from the map data cached in the map toolkit.

In an embodiment, the loading and caching module 1204 is further configured to: perform difference comparison between the map data cached this time and map data cached last time; and deliver, when there is a difference between the map data cached this time and the map data cached last time, the map data cached this time to map toolkits for caching.

In an embodiment, the loading and caching module 1204 is further configured to: deliver the map data to map toolkits; convert, when a coordinate system used by an application corresponding to a map toolkit is different from a coordinate system corresponding to the map data, coordinates of the map data into coordinates in the coordinate system used by the application by using the map toolkit; and cache map data obtained after the coordinate conversion in the map toolkit.

In an embodiment, the loading and caching module 1204 is further configured to: convert longitude and latitude coordinates of points forming the road elements in the map data into coordinates in a topocentric coordinate system, the topocentric coordinate system being a spatial rectangular coordinate system using the current position as an origin; select, for each road element, a center point from points forming the road element; determine offsets of non-center points forming the road element from the center point; and determine coordinates of the non-center points according to coordinates of the center point in the topocentric coordinate system and the offsets corresponding to the non-center points.

In an embodiment, the loading and caching module 1204 is further configured to construct grid indexes and/or tree indexes locally respectively according to the road elements in the map data. The query module 1206 is further configured to: query, when a positioning query request transmitted by the application layer is obtained, coordinates of a position at which the positioning query request is aimed locally according to the grid indexes; and/or query, when an object query request transmitted by the application layer is obtained, information about a road element at which the object query request is aimed locally according to the tree indexes.

Figure 13:
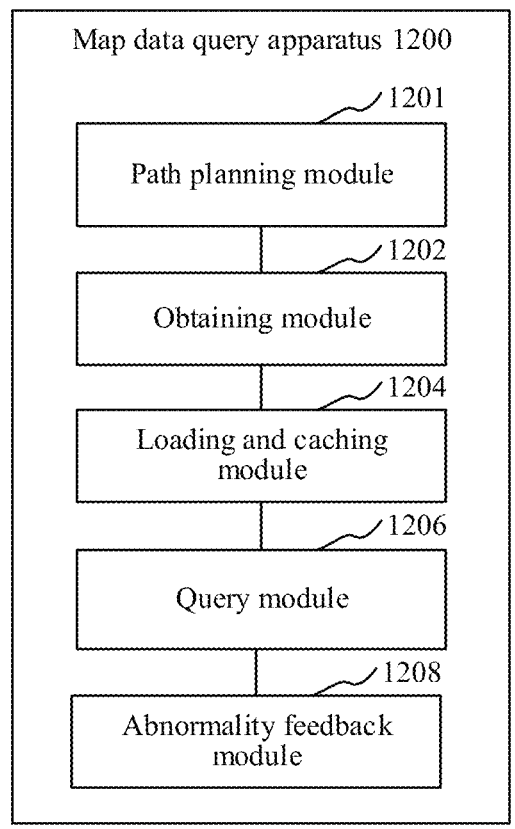
FIG. 13 is a block diagram of a map data query apparatus according to another embodiment.

As shown in FIG. 13, in an embodiment, the apparatus 1200 further includes a path planning module 1201 and an abnormality feedback module 1208.

The abnormality feedback module 1208 is configured to: record abnormal map data not matching environment perception data and being in the map data, the environment perception data being data obtained by perceiving a real environment by the application layer; virtualize the abnormal map data into virtual map data matching the environment perception data; transmit the virtual map data to the application layer; and upload the abnormal map data to the cloud database when the application layer detects that the virtual map data has no abnormality.

For a specific limitation on the map data query apparatus, reference is made to the limitation on the map data query method above, and details are not described herein again. The modules in the foregoing map data query apparatus may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 14:
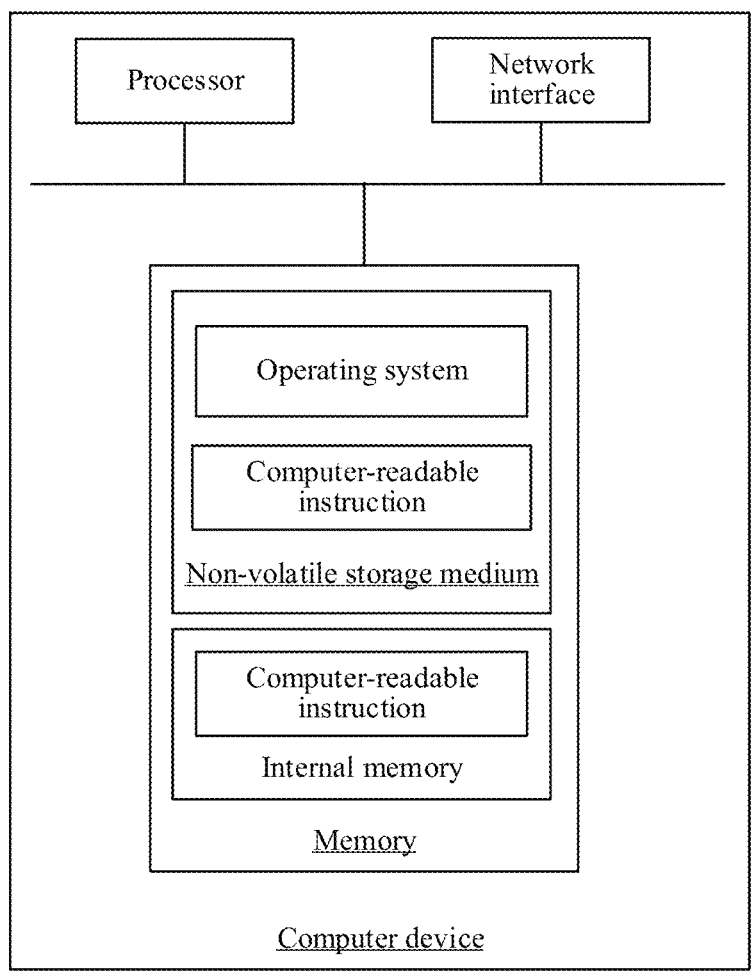
FIG. 14 is a block diagram of a computer device according to an embodiment.

FIG. 14 is a schematic diagram of an inner structure of a computer device according to an embodiment. Referring to FIG. 14, the computer device may be the in-vehicle device 110 in FIG. 1. The computer device includes a processor, a memory, and a network interface that are connected by using a system bus. The memory includes a non-volatile storage medium and an internal memory. The non-volatile storage medium of the computer device may store an operating system and computer-readable instructions. When the computer-readable instructions are executed, the processor may be caused to perform a map data query method. The processor of the computer device is configured to provide calculation and control capabilities, to support running of the entire computer device. The internal memory may store computer-readable instructions, and the computer-readable instructions, when executed by the processor, may cause the processor to perform a map data query method. The network interface of the computer device is configured to perform network communication.

A person skilled in the art may understand that the structure shown in FIG. 14 is only a block diagram of a partial structure related to the solution of this application, and does not limit the computer device to which the solution of this application is applied. Specifically, the computer device may include more or fewer components than those shown in the figure, or some components may be combined, or a different component deployment is used.

In an embodiment, the map data query apparatus provided in this application may be implemented in the form of computer-readable instructions that may run on the computer device shown in FIG. 14. The non-volatile storage medium of the computer device may store various program modules constituting the map data query apparatus, such as the obtaining module 1202, the loading and caching module 1204, and the query module 1206 shown in FIG. 12. The computer-readable instructions formed by the various program modules are used for causing the computer device to perform the steps in the map data query method of the embodiments of this application described in this specification. For example, the computer device may obtain a current position of a vehicle by using the obtaining module 1202 in the map data query apparatus 1200 shown in FIG. 12; and request map data matching the current position from a cloud database, cache the requested map data locally, and construct a spatial index of the map data locally according to road elements in the map data by using the loading and caching module 1204. The computer device may query, when a query request transmitted by an application layer is obtained, map data at which the query request is aimed locally according to the spatial index by using the query module 1206.

In an embodiment, a computer device is provided, including a memory and one or more processors, the memory storing computer-readable instructions, the computer-readable instructions, when executed by the one or more processors, causing the one or more processors to perform the steps of the foregoing map data query method. The steps of the map data query method herein may be the steps of the map data query method in the foregoing embodiments.

In an embodiment, one or more non-transitory computer-readable storage media are provided, storing computer-readable instructions, the computer-readable instructions, when executed by one or more processors of a computer device, causing the computer device to perform the steps of the foregoing map data query method. The steps of the map data query method herein may be the steps of the map data query method in the foregoing embodiments.

The "plurality of" in the embodiments of this application is at least two.

It is to be understood that although the steps in the embodiments of this application are not necessarily performed sequentially in a sequence indicated by step numbers. Unless otherwise explicitly specified in this application, execution of the steps is not strictly limited, and the steps may be performed in other sequences. Moreover, at least some of the steps in each embodiment may include a plurality of sub-steps or a plurality of stages. The sub-steps or stages are not necessarily performed at the same moment but may be performed at different moments. The sub-steps or stages are not necessarily performed sequentially, but may be performed in turn or alternately with another step or at least some of sub-steps or stages of the another step.

A person of ordinary skill in the art may understand that all or some of the procedures of the methods in the foregoing embodiments may be implemented by computer-readable instructions instructing relevant hardware. The program may be stored in a non-volatile computer-readable storage medium. When the program runs, the procedures of the foregoing method embodiments are performed. References to the memory, the storage, the database, or other medium used in the embodiments provided in this application may all include a non-volatile or a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a RAM or an external cache. By way of description rather than limitation, the RAM may be obtained in a plurality of forms, such as a static RAM (SRAM), a dynamic RAM (DRAM), a synchronous DRAM (SDRAM), a double data rate SDRAM (DDR SDRAM), an enhanced SDRAM (ESDRAM), a synchlink (Synchlink) DRAM (SLDRAM), a Rambus (Rambus) direct RAM (RDRAM), a direct Rambus dynamic RAM (DRDRAM), and a Rambus dynamic RAM (RDRAM).

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments only describe several implementations of this application specifically and in detail, but cannot be construed as a limitation to the patent scope of this application. For a person of ordinary skill in the art, several transformations and improvements can be made without departing from the idea of this application. These transformations and improvements belong to the protection scope of this application. Therefore, the protection scope of this application shall be subject to the protection scope of the appended claims.

What is claimed is:

1. A map data query method performed by an in-vehicle computer device that is disposed in a vehicle, the computer device configured to execute a map data engine and a map toolkit that are configured to communicate with each other through an inter-process communication (IPC) layer, the map toolkit configured to provide query and data returning service to an application layer, and the map toolkit includes a map agent layer, a data cache layer, and an asynchronous loading layer that are distinct from one another, the method comprising:
   obtaining a current position of the vehicle while the vehicle is traveling on a predetermined vehicle travel path;
   obtaining, from map data that is cached locally on the computer device, a reference travel position matching the current position of the vehicle, wherein the map data is cached at a previous time;
   determining a difference between the current position and the reference travel position;
   in accordance with a determination that the difference is greater than a preset difference threshold, requesting, from a cloud database, map data matching the current position, including:
      receiving, by the map agent layer in the map toolkit, a path planning request from the application layer;
      establishing a network connection between the computer device and the cloud database;
      dynamically determining, according to the predetermined vehicle travel path, information about paths within a preset range ahead of the current position of the vehicle;
      requesting, by the map data engine from the cloud database via the network connection, map data matching the current position of the vehicle and the information about the paths within the preset range ahead of the current position of the vehicle;
      receiving, by the map data engine, first map data returned from the cloud database;
      forwarding, by the map data engine to the asynchronous loading layer of the map toolkit through the IPC layer, the received first map data;
      generating, by the asynchronous loading layer of the map toolkit, updated locally-cached map data, including adding or deleting map data from the locally-cached map data according to the received first map data;
      updating, by the data cache layer of the map toolkit, a real-time spatial index of the locally-cached map data according to road elements in the received first map data, the road elements including lane lines and traffic lights; and
   in response to a query request transmitted by the application layer associated with the vehicle:
      querying, by the map agent layer from the data cache layer, the updated locally-cached map data at which the query request is aimed according to the updated real-time spatial index to generate a query result;
      returning, by the map agent layer, the query result to the application layer; and
      causing, by the application layer, the vehicle to at least partially self-drive according to the query result.

2. The method according to claim 1, wherein the information about the paths is determined through a path planning operation, and the path planning operation comprises:
   obtaining a path planning request transmitted by the application layer;
   transmitting a point of interest carried in the path planning request to the cloud database;
   caching path planning information returned by the cloud database and made for the point of interest locally; and
   returning the information about the paths to the application layer.

3. The method according to claim 1, wherein the requested map data is cached locally at the computer device at a present time, the map toolkit is a first map toolkit of a plurality of map toolkits, and the method further comprises:
   delivering the map data cached locally at the present time to the plurality of map toolkits for caching, the plurality of map toolkits being disposed locally respectively corresponding to applications in the application layer; and
   querying the locally-cached map data at which the query request is aimed according to the real-time spatial index comprises:
      querying, when a respective map toolkit receives a query request transmitted by a corresponding application, the locally-cached map data at which the query request is aimed from the map data cached in the respective map toolkit.

4. The method according to claim 3, further comprising:
   performing difference comparison between the map data cached locally on the computer device at the present time and the map data cached locally on the computer device at the previous time; and
   when there is a difference between the map data cached locally at the present time and the map data cached locally at the previous time, performing the operation of delivering the map data cached locally at the present time to the plurality of map toolkits for caching.

5. The method according to claim 3, wherein delivering the map data cached locally at the present time to the plurality of map toolkits for caching comprises:
   delivering the locally-cached map data to the plurality of map toolkits; and
   when a coordinate system used by an application corresponding to a respective map toolkit is different from a coordinate system corresponding to the map data, converting coordinates of the map data into coordinates in the coordinate system used by the application by using the respective map toolkit.

6. The method according to claim 5, wherein the converting coordinates of the map data into coordinates in the coordinate system used by the application by using the respective map toolkit comprises:
   converting longitude and latitude coordinates of points forming the road elements in the map data into coordinates in a topocentric coordinate system, the topocentric coordinate system being a spatial rectangular coordinate system using the current position as an origin;
   selecting, for each road element, a center point from points forming the road element;

determining offsets of non-center points forming the road element from the center point; and determining coordinates of the non-center points according to coordinates of the center point in the topocentric coordinate system and the offsets corresponding to the non-center points.

7. The method according to claim 1, wherein:

updating the real-time spatial index of the locally-cached map data according to the road elements comprises:
constructing grid indexes locally respectively according to the road elements in the received first map data; and querying the updated locally-cached map data at which the query request is aimed according to the updated real-time spatial index comprises:
when a positioning query request transmitted by the application layer is obtained, querying coordinates of a position at which the positioning query request is aimed according to the grid indexes.

8. The method according to claim 1, wherein:

updating the real-time spatial index of the locally-cached map data according to the road elements comprises:
constructing tree indexes locally respectively according to the road elements in; and querying the updated locally-cached map data at which the query request is aimed according to the real-time spatial index comprises:
when an object query request transmitted by the application layer is obtained, querying information about a road element at which the object query request is aimed according to the tree indexes.

9. The method according to claim 1, further comprising:

recording abnormal map data not matching environment perception data in the locally-cached map data, the environment perception data being data obtained by perceiving a real environment by the application layer;

virtualizing the abnormal map data into virtual map data matching the environment perception data;

transmitting the virtual map data to the application layer; and uploading the abnormal map data to the cloud database when the application layer detects that the virtual map data has no abnormality.

10. The method according to claim 9, further comprising:

performing the operation of virtualizing the abnormal map data into virtual map data matching the environment perception data when abnormal map data reported in a plurality of consecutive frames is obtained; and when abnormal map data reported in a plurality of consecutive frames is not obtained and only one piece of abnormal map data is obtained, reporting the abnormal map data to the cloud database.

11. An in-vehicle computer device that is disposed in a vehicle, the computer device configured to execute a map data engine and a map toolkit that are configured to communicate with each other through an inter-process communication (IPC) layer, the map toolkit configured to provide query and data returning service to an application layer, and the map toolkit includes a map agent layer, a data cache layer, and an asynchronous loading layer that are distinct from one another, the computer device further comprising:

a memory; and one or more processors, the memory storing computer-readable instructions, the computer-readable instructions, when executed by the one or more processors, cause the computer device to perform a plurality of operations including:

obtaining a current position of the vehicle while the vehicle is traveling on a predetermined vehicle travel path;

obtaining, from map data that is cached locally on the computer device, a reference travel position matching the current position of the vehicle, wherein the map data is cached at a previous time;

determining a difference between the current position and the reference travel position;

in accordance with a determination that the difference is greater than a preset difference threshold, requesting, from a cloud database, map data matching the current position, including:
receiving, by the map agent layer in the map toolkit, a path planning request from the application layer;

establishing a network connection between the computer device and the cloud database;

dynamically determining, according to the predetermined vehicle travel path, information about paths within a preset range ahead of the current position of the vehicle;

requesting, by the map data engine from the cloud database via the network connection, map data matching the current position of the vehicle and the information about the paths within the preset range ahead of the current position of the vehicle;

receiving, by the map data engine, first map data returned from the cloud database;

forwarding, by the map data engine to the asynchronous loading layer of the map toolkit through the IPC layer, the received first map data;

generating, by the asynchronous loading layer of the map toolkit, updated locally-cached map data, including adding or deleting map data from the locally-cached map data according to the received first map data;

updating, by the data cache layer of the map toolkit, a real-time spatial index of the locally-cached map data according to road elements in the received first map data, the road elements including lane lines and traffic lights; and in response to a query request transmitted by the application layer associated with the vehicle:
querying, by the map agent layer from the data cache layer, the updated locally-cached map data at which the query request is aimed according to the updated real-time spatial index to generate a query result;

returning, by the map agent layer, the query result to the application layer; and causing, by the application layer, the vehicle to at least partially self-drive according to the query result.

12. The computer device according to claim 11, wherein the requested map data is cached locally at the computer device at a present time, the map toolkit is a first map toolkit of a plurality of map toolkits, and the plurality of operations further comprise:

delivering the map data cached locally at the present time to the plurality of map toolkits for caching, the plurality of map toolkits being disposed locally respectively corresponding to applications in the application layer; and querying the locally-cached map data at which the query request is aimed according to the real-time spatial index comprises:

querying, when a respective map toolkit receives a query request transmitted by a corresponding application, the locally-cached map data at which the query request is aimed from the map data cached in the respective map toolkit.

13. The computer device according to claim 11, wherein:
updating the real-time spatial index of the locally-cached map data according to the road elements comprises:
constructing grid indexes locally respectively according to the road elements; and
querying the updated locally-cached map data at which the query request is aimed according to the updated real-time spatial index comprises:
when a positioning query request transmitted by the application layer is obtained, querying coordinates of a position at which the positioning query request is aimed according to the grid indexes.

14. The computer device according to claim 11, wherein:
updating the real-time spatial index of the locally-cached map data according to the road elements comprises:
constructing tree indexes locally respectively according to the road elements; and
querying the updated locally-cached map data at which the query request is aimed according to the real-time spatial index comprises:
when an object query request transmitted by the application layer is obtained, querying information about a road element at which the object query request is aimed according to the tree indexes.

15. The computer device according to claim 11, wherein the plurality of operations further comprise:
recording abnormal map data not matching environment perception data in the locally-cached map data, the environment perception data being data obtained by perceiving a real environment by the application layer;
virtualizing the abnormal map data into virtual map data matching the environment perception data;
transmitting the virtual map data to the application layer; and
uploading the abnormal map data to the cloud database when the application layer detects that the virtual map data has no abnormality.

16. One or more non-transitory computer-readable storage media, storing computer-readable instructions that are configured to be executed by one or more processors of an in-vehicle computer device that is disposed in a vehicle, the computer device configured to execute a map data engine and a map toolkit that are configured to communicate with each other through an inter-process communication (IPC) layer, the map toolkit configured to provide query and data returning service to an application layer, and the map toolkit includes a map agent layer, a data cache layer, and an asynchronous loading layer that are distinct from one another, the computer-readable instructions, when executed by the computer device, cause the computer device to perform a plurality of operations including:
obtaining a current position of the vehicle while the vehicle is traveling on a predetermined vehicle travel path;
obtaining, from map data that is cached locally on the computer device, a reference travel position matching the current position of the vehicle, wherein the map data is cached at a previous time;
determining a difference between the current position and the reference travel position;
in accordance with a determination that the difference is greater than a preset difference threshold, requesting, from a cloud database, map data matching the current position, including:
receiving, by the map agent layer in the map toolkit, a path planning request from the application layer;
establishing a network connection between the computer device and the cloud database;
dynamically determining, according to the predetermined vehicle travel path, information about paths within a preset range ahead of the current position of the vehicle;
requesting, by the map data engine from the cloud database via the network connection, map data matching the current position of the vehicle and the information about the paths within the preset range ahead of the current position of the vehicle;
receiving, by the map data engine, first map data returned from the cloud database;
forwarding, by the map data engine to the asynchronous loading layer of the map toolkit through the IPC layer, the received first map data;
generating, by the asynchronous loading layer of the map toolkit, updated locally-cached map data, including adding or deleting map data from the locally-cached map data according to the received first map data;
updating, by the data cache layer of the map toolkit, a real-time spatial index of the locally-cached map data according to road elements in the received first map data, the road elements including lane lines and traffic lights; and
in response to a query request transmitted by the application layer associated with the vehicle:
querying, by the map agent layer from the data cache layer, the locally-cached map data at which the query request is aimed according to the real-time spatial index to generate a query result;
returning, by the map agent layer, the query result to the application layer; and
causing, by the application layer, the vehicle to at least partially self-drive according to the query result.

* * * * *